United States Patent
Ghuge et al.

(10) Patent No.: US 10,560,553 B2
(45) Date of Patent: Feb. 11, 2020

(54) ASSIGNING IP POOLS TO FILE ACCESS PROTOCOLS FOR NAS FAILOVER

(71) Applicant: International Business Machines Corporation, Armonk, NY (US)

(72) Inventors: Deepak R. Ghuge, Ahmednagar (IN); Sandeep R. Patil, Pune (IN)

(73) Assignee: International Business Machines Corporation, Armonk, NY (US)

(*) Notice: Subject to any disclaimer, the term of this patent is extended or adjusted under 35 U.S.C. 154(b) by 453 days.

(21) Appl. No.: 15/264,748

(22) Filed: Sep. 14, 2016

(65) Prior Publication Data

US 2018/0077268 A1    Mar. 15, 2018

(51) Int. Cl.
| | |
|---|---|
| *G06F 15/16* | (2006.01) |
| *H04L 29/06* | (2006.01) |
| *H04L 29/08* | (2006.01) |
| *H04L 29/12* | (2006.01) |

(52) U.S. Cl.
CPC .......... *H04L 69/18* (2013.01); *H04L 61/2061* (2013.01); *H04L 67/1097* (2013.01)

(58) Field of Classification Search
CPC ............... G06F 3/0613; G06F 11/2025; G06F 11/2089; G06F 17/30067; G06F 17/30197; H04L 29/06; H04L 67/1002
See application file for complete search history.

(56) References Cited

U.S. PATENT DOCUMENTS

| | | | |
|---|---|---|---|
| 7,558,863 B1 | 7/2009 | Sitaraman et al. | |
| 7,694,191 B1 | 4/2010 | Bono et al. | |
| 7,958,385 B1 * | 6/2011 | Frangioso | G06F 11/2025 709/223 |
| 8,255,550 B1 | 8/2012 | Becher et al. | |
| 8,631,277 B2 | 1/2014 | Swan et al. | |
| 2004/0148329 A1 * | 7/2004 | Ogasawara | H04L 29/06 709/200 |
| 2004/0153740 A1 * | 8/2004 | Fujimoto | G06F 11/2089 714/6.31 |

(Continued)

OTHER PUBLICATIONS

Unknown, "Network-attached storage," Wikipedia, last modified on May 31, 2016, printed on Jun. 23, 2016, 6 pages.

*Primary Examiner* — Dustin Nguyen

(74) *Attorney, Agent, or Firm* — Peter Edwards

(57) ABSTRACT

The present invention provides a computer implemented method, system, and computer program product of assigning pools of internet protocols to file access protocols for network-attached storage (NAS) failover. In an exemplary embodiment, the present invention includes generating, by a computer system, a pool of internet protocol addresses for each of a plurality of computer file access protocols running on a plurality of protocol node computer systems, where the protocol nodes are configured to access a plurality of computer files stored on a NAS system via computer file access protocol services corresponding to the file access protocols, resulting in IP pools comprising IP addresses, and for each IP pool, among the IP pools, corresponding to a file access protocol among the file access protocols, assigning, by the computer system, the IP addresses in the IP pool to protocol nodes, among the protocol nodes, for which the file access protocol is operational.

17 Claims, 9 Drawing Sheets

(56) References Cited

U.S. PATENT DOCUMENTS

| | | | |
|---|---|---|---|
| 2005/0044162 A1* | 2/2005 | Liang | G06F 17/30067 |
| | | | 709/212 |
| 2005/0223014 A1* | 10/2005 | Sharma | G06F 17/30197 |
| 2013/0073717 A1* | 3/2013 | Collin | G06F 3/0613 |
| | | | 709/224 |
| 2015/0006707 A1 | 1/2015 | Malik et al. | |

* cited by examiner

ASSIGNING IP POOLS TO FILE ACCESS PROTOCOLS FOR NAS FAILOVER

BACKGROUND

The present disclosure relates to computer file access, and more specifically, to assigning pools of internet protocols to file access protocols for network-attached storage (NAS) failover.

SUMMARY

The present invention provides a computer implemented method, a system, and a computer program product of assigning pools of internet protocols to file access protocols for network-attached storage (NAS) failover. In an exemplary embodiment, the computer implemented method, the system, and the computer program product include (1) generating, by a computer system, a pool of internet protocol (IP) addresses (IP pool) for each of a plurality of computer file access protocols (file access protocols) running on a plurality of protocol node computer systems (protocol nodes), where the protocol nodes are configured to access a plurality of computer files stored on a network-attached storage (NAS) system via computer file access protocol services (protocol services) corresponding to the file access protocols, resulting in IP pools comprising IP addresses, and (2) for each IP pool, among the IP pools, corresponding to a file access protocol among the file access protocols, assigning, by the computer system, the IP addresses in the IP pool to protocol nodes, among the protocol nodes, for which the file access protocol is operational.

In an exemplary embodiment, the computer implemented method, the system, and the computer program product further include (a) in response to determining, by the computer system, that a protocol service among the protocol services is inoperable (inoperable protocol service) for a protocol node among the protocol nodes, storing, by the computer system, in a computer memory a value that indicates that a file access protocol, among the file access protocols, corresponding to the inoperable protocol service for the protocol node is inoperable (inoperable node file access protocol), and (b) in response to calculating, by the computer system, that the stored value indicates that the file access protocol for the protocol node is inoperable, distributing, by the computer system, the IP addresses in the IP pool for the inoperable node file access protocol to protocol nodes, among the protocol nodes, for which the file access protocol is operational.

In an exemplary embodiment, the computer implemented method, the system, and the computer program product further include (a) for a file access protocol, among the file access protocols, running on a protocol node among the protocol nodes, in response to determining, by the computer system, that at least one dependent computer service (dependent service) of a set of dependent computer services, where the set is required for the file access protocol to be operable, is inoperable, storing, by the computer system, in a computer memory a value that indicates that the file access protocol for the protocol node is inoperable (inoperable node file access protocol), and (b) in response to calculating, by the computer system, that the stored value indicates that the file access protocol for the protocol node is inoperable, distributing, by the computer system, the IP addresses in the IP pool for the inoperable node file access protocol to protocol nodes, among the protocol nodes, for which the file access protocol is operational.

In an exemplary embodiment, the computer implemented method, the system, and the computer program product further include (a) in response to determining, by the computer system, that a system wide computer service (system wide service) for a protocol node among the protocol nodes, where the system wide service is required for the protocol node to be operable, is inoperable, storing, by the computer system, in a computer memory a value that indicates that the protocol node is inoperable (inoperable protocol node), and (b) in response to calculating, by the computer system, that the stored value indicates that the protocol node is inoperable, distributing, by the computer system, the IP addresses in the IP pools for the file access protocols corresponding to the inoperable protocol node to protocol nodes, among the protocol nodes, for which the file access protocols are operational, respectively.

DETAILED DESCRIPTION

Figure 1A:
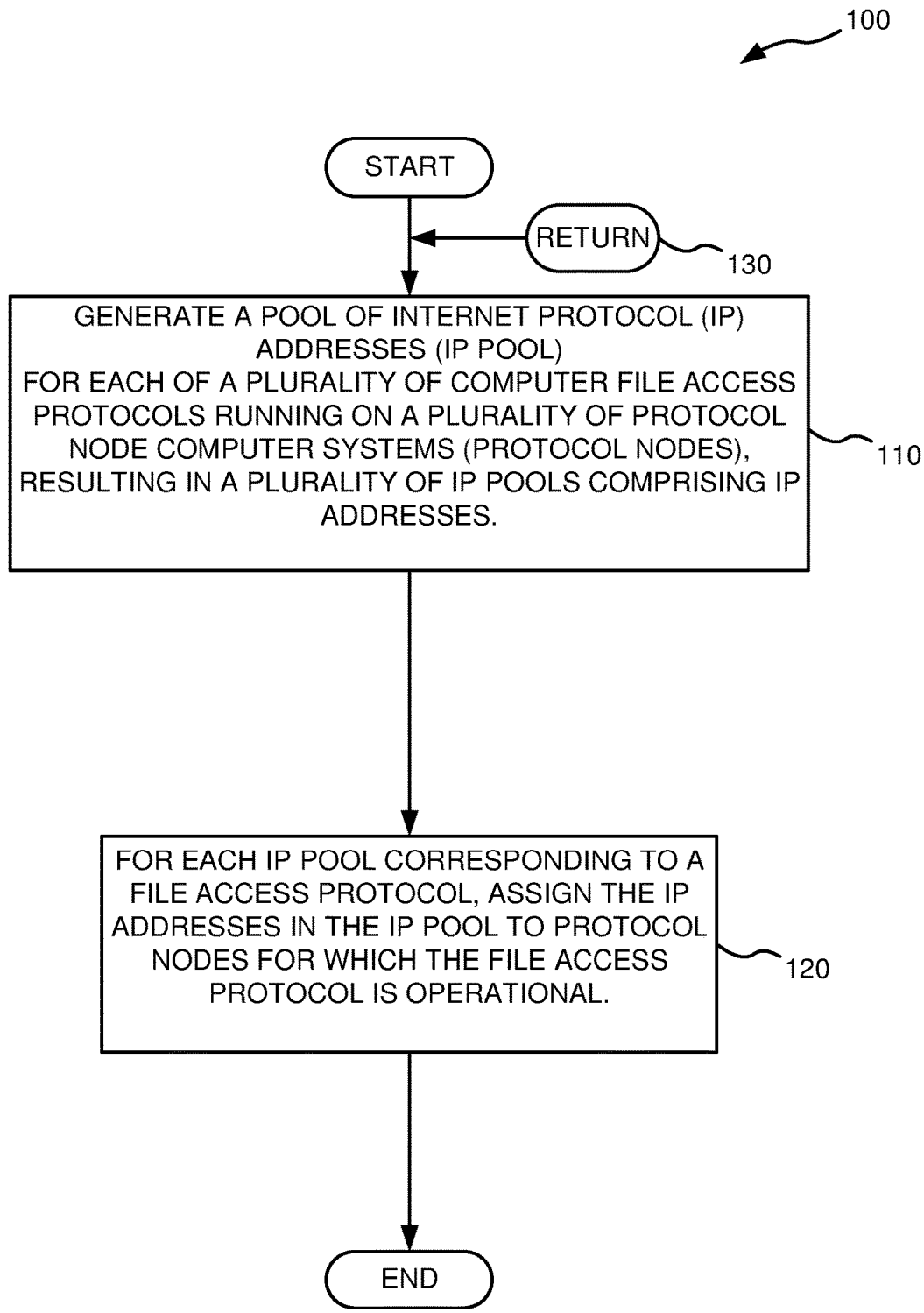
FIG. 1A depicts a flowchart in accordance with an exemplary embodiment of the present invention.

The present invention provides a computer implemented method, a system, and a computer program product of assigning pools of internet protocols to file access protocols for network-attached storage (NAS) failover. In an exemplary embodiment, the computer implemented method, the system, and the computer program product include (1) generating, by a computer system, a pool of internet protocol (IP) addresses (IP pool) for each of a plurality of computer file access protocols (file access protocols) running on a plurality of protocol node computer systems (protocol nodes), where the protocol nodes are configured to access a plurality of computer files stored on a network-attached storage (NAS) system via computer file access protocol services (protocol services) corresponding to the file access protocols, resulting in IP pools comprising IP addresses, and (2) for each IP pool, among the IP pools, corresponding to a file access protocol among the file access protocols, assigning, by the computer system, the IP addresses in the IP pool to protocol nodes, among the protocol nodes, for which the file access protocol is operational.

Definitions

The Internet Protocol (IP) is the principal communications protocol in the Internet protocol suite for relaying datagrams across network boundaries. Its routing function enables internetworking, and essentially establishes the Internet. IP has the task of delivering packets from the source host to the destination host solely based on the IP addresses in the packet headers. For this purpose, IP defines packet structures that encapsulate the data to be delivered. It also defines addressing methods that are used to label the datagram with source and destination information. IP is responsible for addressing hosts and for routing datagrams (packets) from a source host to a destination host across one or more IP networks. For this purpose, IP defines the format of packets and provides an addressing system that has the following two functions: identifying hosts; and providing a logical location service.

An Internet Protocol address (IP address) is a numerical label assigned to each device (e.g., computer, printer) participating in a computer network that uses the Internet Protocol for communication. An IP address serves the following two principal functions: host or network interface identification; and location addressing. IP addresses are usually written and displayed in human-readable notations, such as 172.16.254.1 (IPv4), and 2001:db8:0:1234:0:567: 8:1 (IPv6).

Network-attached storage (NAS) is a file-level computer data storage server connected to a computer network providing data access to a heterogeneous group of clients. A NAS system/server is specialized for serving files either by its hardware, software, or configuration. It is often manufactured as a computer appliance—a purpose-built specialized computer. NAS systems are networked appliances which contain one or more storage drives, often arranged into logical, redundant storage containers or a redundant array of independent disks (RAID). RAID is a data storage virtualization technology that combines multiple physical disk drive components into a single logical unit for the purposes of data redundancy, performance improvement, or both. Network-attached storage removes the responsibility of file serving from other servers on the network. NAS systems typically provide access to files using network file sharing protocols such as Network Files System (NFS), Server Message Block/Common Internet File System (SMB/CIFS), or Apple Filing Protocol (AFP), or NetWare®Core Protocol (NCP). Potential benefits of dedicated NAS, compared to general-purpose servers also serving files, include faster data access, easier administration, and simple configuration. A NAS system/unit is a computer connected to a network that provides only file-based data storage services to other devices on the network. Although it may technically be possible to run other software on a NAS unit, it is usually not designed to be a general-purpose server. For example, NAS units usually do not have a keyboard or display, and are controlled and configured over the network, often using a browser. NAS units rarely limit clients to a single protocol. A NAS system is useful for more than just general centralized storage provided to client computers in environments with large amounts of data. A NAS system can enable simpler and lower cost systems such as load-balancing and fault-tolerant email and web server systems by providing storage services.

Referring to FIG. 1A, in an exemplary embodiment, the present invention is configured to perform an operation 110 of generating, by a computer system, a pool of internet protocol (IP) addresses (IP pool) for each of a plurality of computer file access protocols (file access protocols) running on a plurality of protocol node computer systems (protocol nodes), where the protocol nodes are configured to access a plurality of computer files stored on a network-attached storage (NAS) system via a plurality of computer file access protocol services (protocol services) corresponding to the file access protocols, resulting in a plurality of IP pools comprising IP addresses, and an operation 120 of, for each IP pool, among the IP pools, corresponding to a file access protocol among the file access protocols, assigning, by the computer system, the IP addresses in the IP pool to protocol nodes, among the protocol nodes, for which the file access protocol is operational. For example, if the present invention is operating in the context of three protocol nodes (e.g., node 1, node 2, and node 3) and six IP addresses, then the present invention would assign to each of the three protocol nodes two of the six IP addresses.

Figure 5:
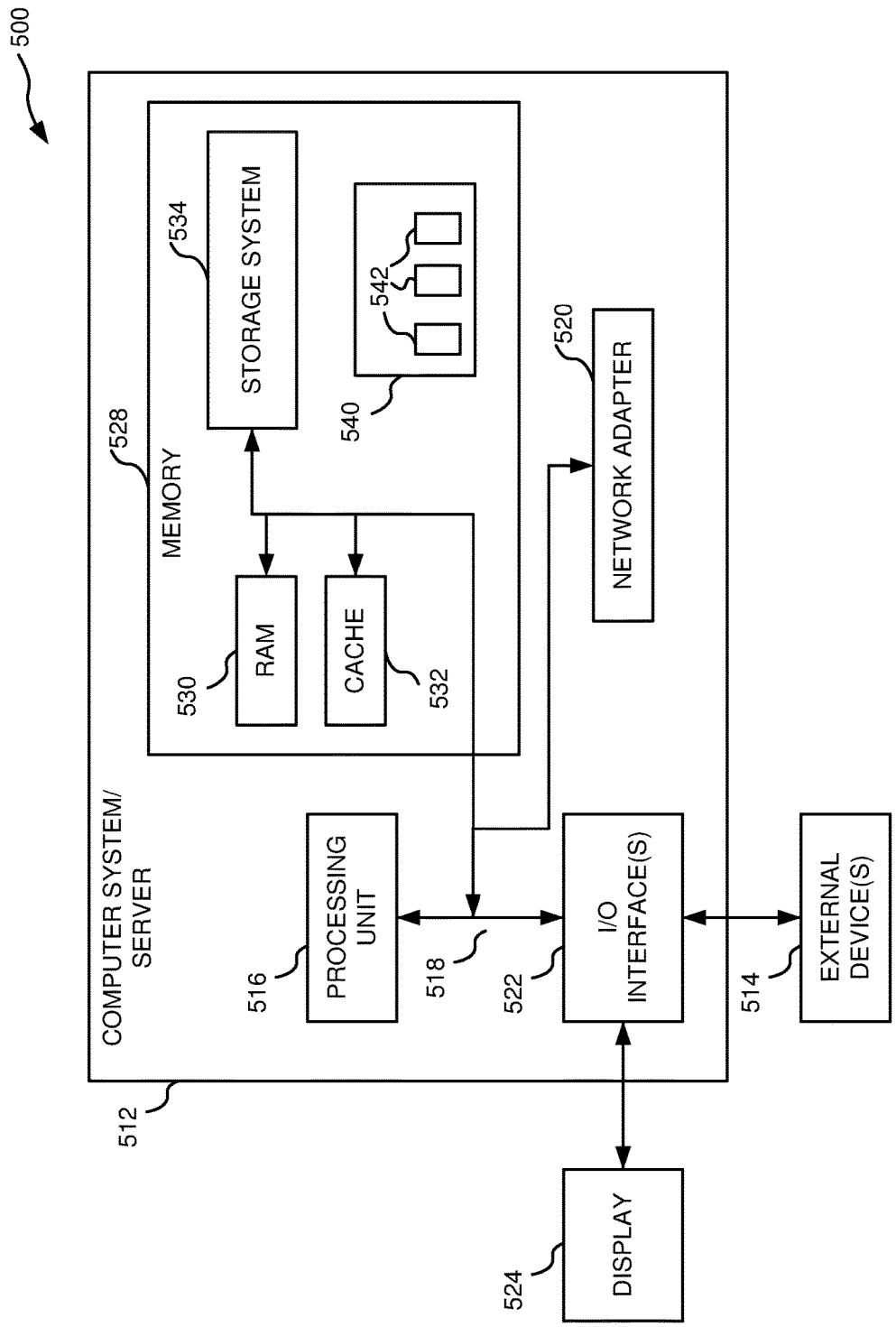
FIG. 5 depicts a computer system in accordance with an exemplary embodiment of the present invention.

In an exemplary embodiment, the computer system is a central server or an active monitoring administration node computer system (node), such as computer system 500 shown in FIG. 5, that executes a computer storage system management script or computer software application that carries out the operations of at least method 100. In an exemplary embodiment, the computer system monitors and provides at least some control of the NAS.

In an exemplary embodiment, each of the file access protocols is selected from the group consisting of Common Internet File System (CIFS), Network File System (NFS), OBJECT, Hypertext Transfer Protocol (HTTP), and File Transfer Protocol (FTP). CIFS is a standard way that computer users share files across corporate intranets and the Internet, is a version of a Server Message Block (SMB) protocol, and defines a series of commands used to pass information between networked computers. NFS is a distributed file system protocol that allows a user on a client computer to access files over a computer network much like local storage is accessed. HTTP is an application protocol for distributed, collaborative, hypermedia information systems and is the foundation of data communication for the World Wide Web and is the protocol to exchange or transfer hypertext (structured text that uses logical links (hyperlinks) between nodes containing text). FTP is a standard network protocol used to transfer computer files between a client and server on a computer network, is built on a client-server model architecture, and uses separate control and data connections between the client and the server, where FTP users may authenticate themselves with a clear-text sign-in protocol, normally in the form of a username and password, but can connect anonymously if the server is configured to allow it.

Figure 1B:
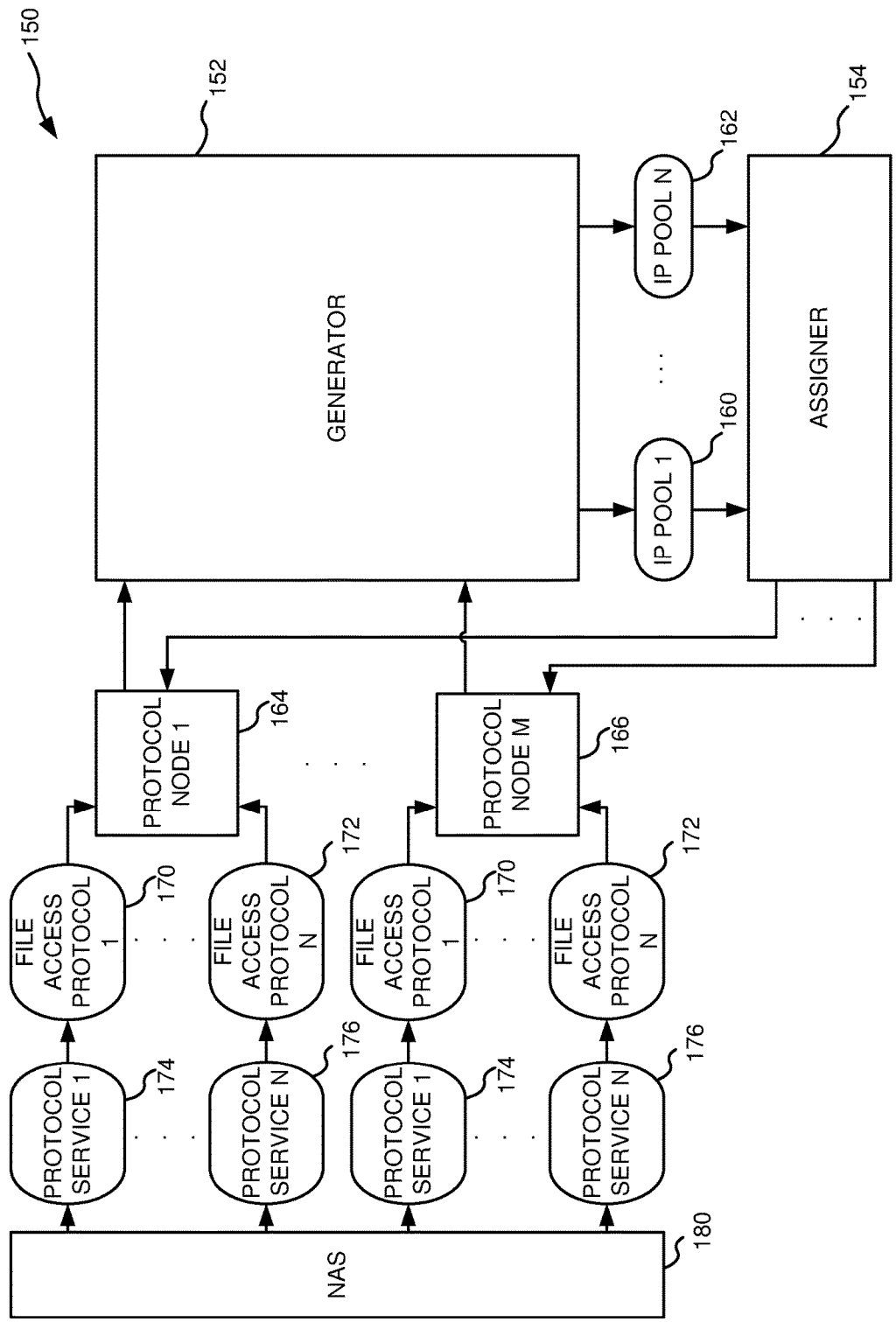
FIG. 1B depicts a block diagram in accordance with an exemplary embodiment of the present invention.

Referring to FIG. 1B, in an exemplary embodiment, the present invention includes a generator 152 and an assigner 154. In an exemplary embodiment, generator 152 is configured to generate a pool of internet protocol (IP) addresses (IP pool), for each of a plurality of computer file access protocols (file access protocols) 170 and 172 running on a plurality of protocol node computer systems (protocol nodes) 164 and 166, where protocol nodes 164 and 166 are configured to access a plurality of computer files stored on a network-attached storage (NAS) system 180 via a plurality of computer file access protocol services (protocol services) 174 and 176 corresponding to file access protocols 170 and 172, resulting in a plurality of IP pools 160 and 162 comprising IP addresses. In an exemplary embodiment, assigner 154 is configured, for each IP pool, among IP pools 160 and 162, corresponding to a file access protocol among file access protocols 170 and 172, to assign, the IP addresses in the IP pool to protocol nodes, among protocol nodes 164 and 166, for which the file access protocol is operational.

In an exemplary embodiment, generator 152 includes a computer system, such as computer system 500 as shown in FIG. 5, performing operation 110. In an exemplary embodiment, generator 152 is implemented as computer software executing on a computer system, such as computer system 500 as shown in FIG. 5, such that the computer system performs operation 110. In an exemplary embodiment, assigner 154 includes a computer system, such as computer system 500 as shown in FIG. 5, performing operation 120. In an exemplary embodiment, assigner 154 is implemented as computer software executing on a computer system, such as computer system 500 as shown in FIG. 5, such that the computer system performs operation 120.

Inoperable Protocol Service

Figure 2A:
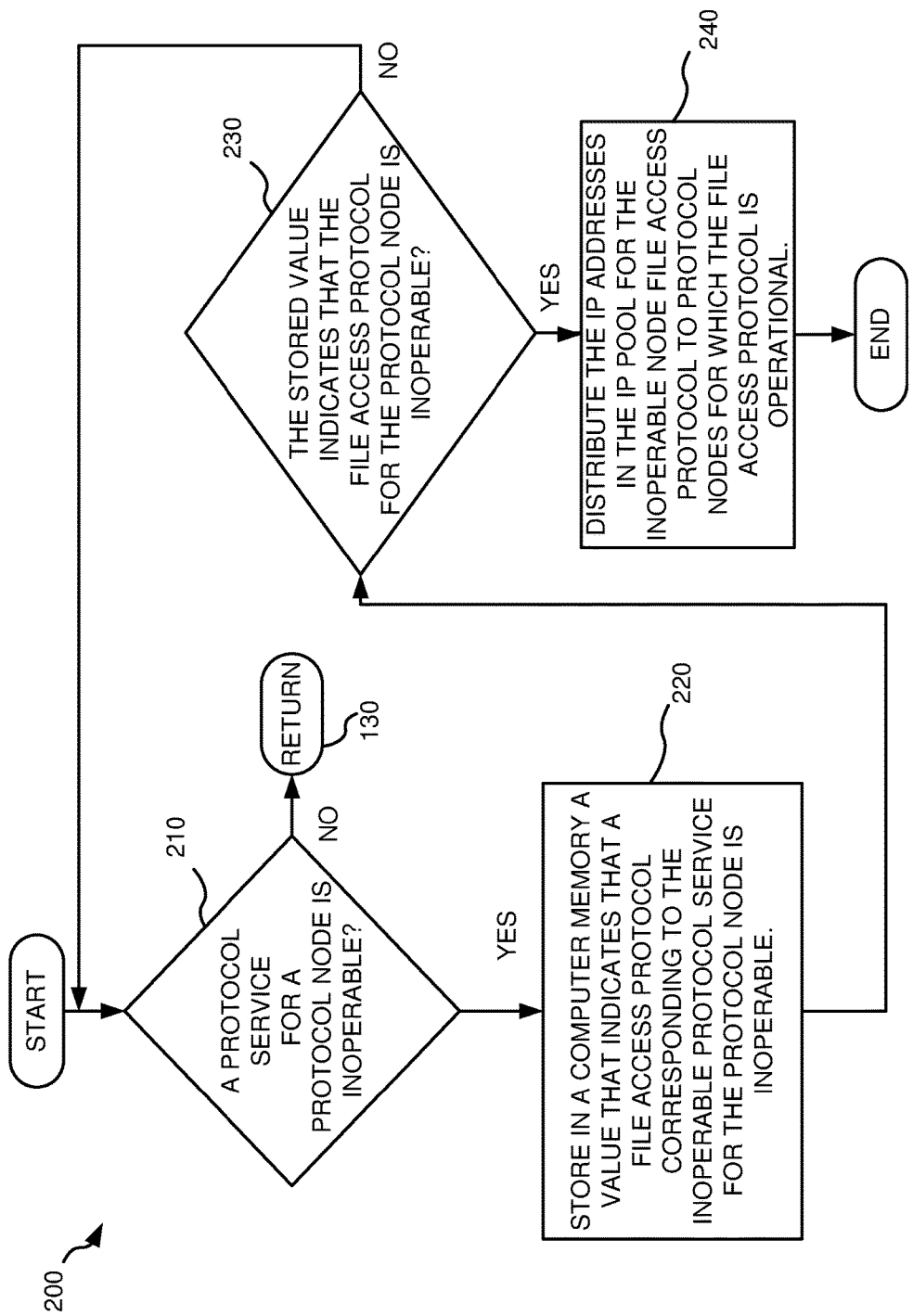
FIG. 2A depicts a flowchart in accordance with an exemplary embodiment of the present invention.

In an exemplary embodiment, the computer implemented method, the system, and the computer program product further include (a) in response to determining, by the computer system, that a protocol service among the protocol services is inoperable (inoperable protocol service) for a protocol node among the protocol nodes, storing, by the computer system, in a computer memory a value that indicates that a file access protocol, among the file access protocols, corresponding to the inoperable protocol service for the protocol node is inoperable (inoperable node file access protocol), and (b) in response to calculating, by the computer system, that the stored value indicates that the file access protocol for the protocol node is inoperable, distributing, by the computer system, the IP addresses in the IP pool for the inoperable node file access protocol to protocol nodes, among the protocol nodes, for which the file access protocol is operational. Referring to FIG. 2A, in an exemplary embodiment, the present invention is further configured to perform an operation 210 of determining, by the computer system, whether a protocol service among the protocol services is inoperable (inoperable protocol service) for a protocol node among the protocol nodes, and, in response to determining that the protocol service among the protocol services is inoperable, an operation 220 of storing, by the computer system, in a computer memory a value that indicates that a file access protocol, among the file access protocols, corresponding to the inoperable protocol service for the protocol node is inoperable (inoperable node file access protocol). In an exemplary embodiment, the present invention is further configured to perform an operation 230 of calculating, by the computer system, whether the stored value indicates that the file access protocol for the protocol node is inoperable, and, in response to calculating that the stored value indicates that the file access protocol for the protocol node is inoperable, an operation 240 of distributing the IP addresses in the IP pool for the inoperable node file access protocol to protocol nodes, among the protocol nodes, for which the file access protocol is operational. In an exemplary embodiment, the computer system is a central server or an active monitoring administration node computer system (node), such as computer system 500 shown in FIG. 5, that executes a computer storage system management script or computer software application that carries out the operations of at least method 200.

In an exemplary embodiment, the distributing includes assigning, by the computer system, the IP addresses in the IP pool for the inoperable node file access protocol to the protocol nodes, among the protocol nodes, for which the file access protocol is operational, in an equally distributed round robin fashion. In an exemplary embodiment, the present invention is configured to perform operation 240 by assigning, by the computer system, the IP addresses in the IP pool for the inoperable node file access protocol to the protocol nodes, among the protocol nodes, for which the file access protocol is operational, in an equally distributed round robin fashion. For example, if the present invention is operating in the context of three protocol nodes (e.g., node 1, node 2, and node 3) and six IP addresses such that the present invention had assigned to each of the three protocol nodes two of the six IP addresses and if a file access protocol is then found not to be operational on one of the three protocol nodes (e.g., node 1), then the present invention would assign the IP addresses in the IP pool for the inoperable file access protocol to the remaining two protocol nodes (e.g., node 2 and node 3) if the file access protocol is operational on the two remaining protocol nodes (e.g., node 2 and node 3).

Figure 2B:
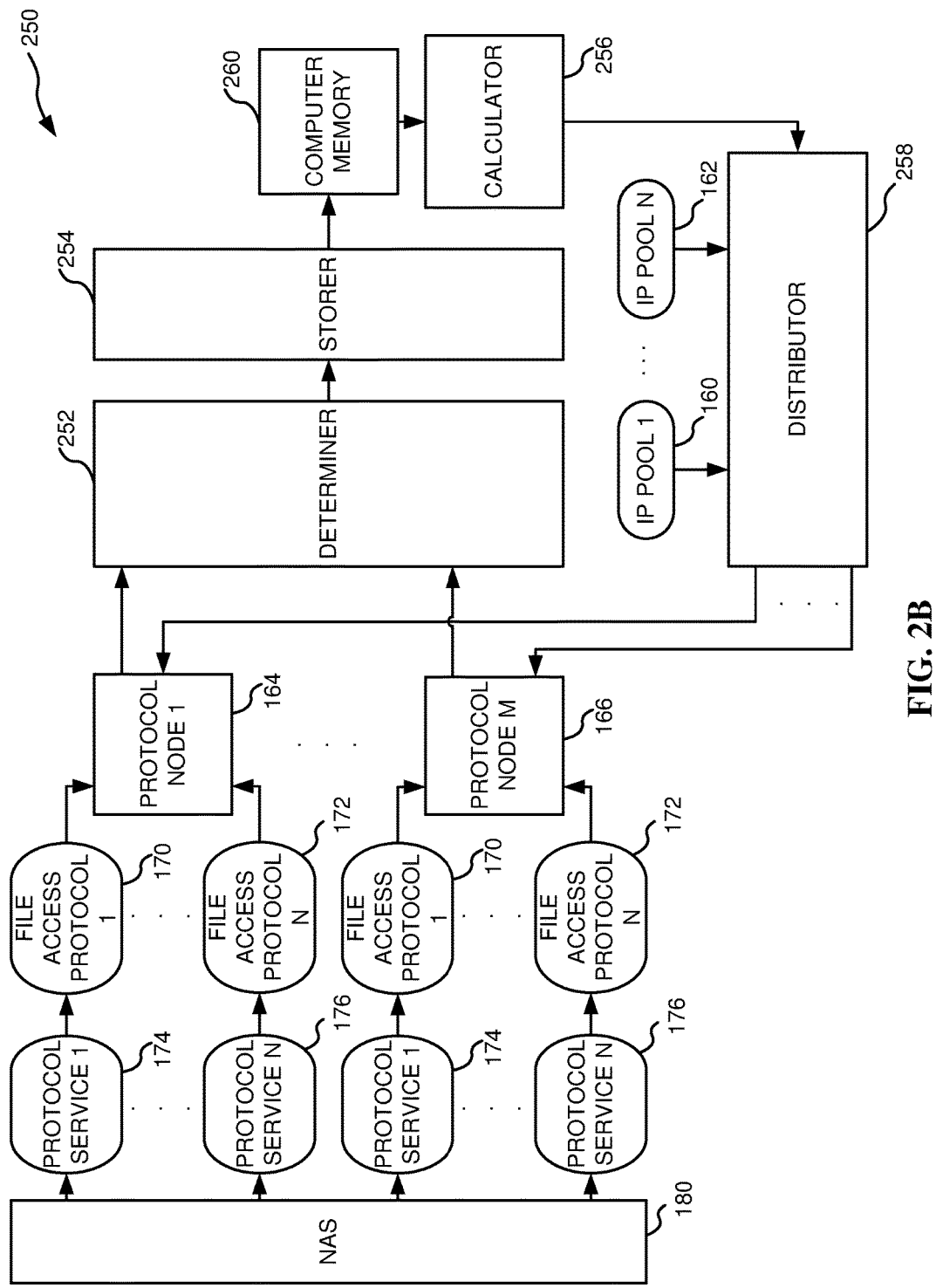
FIG. 2B depicts a block diagram in accordance with an exemplary embodiment of the present invention.

Referring to FIG. 2B, in an exemplary embodiment, the present invention further includes a determiner 252, a storer 254, a calculator 256, and a distributor 258. In an exemplary embodiment, determiner 252 is configured to determine whether a protocol service among protocol services 174 and 176 is inoperable (inoperable protocol service) for a protocol node among protocol nodes 164 and 166. In an exemplary embodiment, storer 254 is configured, in response to determiner 252 determining that the protocol service among protocol services 174 and 176 is inoperable, to store in a computer memory 260 a value that indicates that a file access protocol, among file access protocols 170 and 172, corresponding to the inoperable protocol service for the protocol node is inoperable (inoperable node file access protocol). In an exemplary embodiment, calculator 256 is configured to calculate whether the stored value indicates that the file access protocol for the protocol node is inoperable. In an exemplary embodiment, distributor 258 is configured, in response to calculator 256 calculating that the stored value indicates that the file access protocol for the protocol node is inoperable, to distribute the IP addresses in the IP pool for the inoperable node file access protocol to protocol nodes, among protocol nodes 170 and 172, for which the file access protocol is operational. In an exemplary embodiment, determiner 252 includes a computer system, such as computer system 500 as shown in FIG. 5, performing operation 210. In an exemplary embodiment, determiner 252 is implemented as computer software executing on a computer system, such as computer system 500 as shown in FIG. 5, such that the computer system performs operation 210. In an exemplary embodiment, storer 254 includes a computer system, such as computer system 500 as shown in FIG. 5, performing operation 220. In an exemplary embodiment, storer 254 is implemented as computer software executing on a computer system, such as computer system 500 as shown in FIG. 5, such that the computer system performs operation 220. In an exemplary embodiment, calculator 256 includes a computer system, such as computer system 500 as shown in FIG. 5, performing operation 230. In an exemplary embodiment, calculator 256 is implemented as computer software executing on a computer system, such as computer system 500 as shown in FIG. 5, such that the computer system performs operation 230. In an exemplary embodiment, distributor 258 includes a computer system, such as computer system 500 as shown in FIG. 5, performing operation 240. In an exemplary embodiment, distributor 258 is implemented as computer software executing on a computer system, such as computer system 500 as shown in FIG. 5, such that the computer system performs operation 240.

Inoperable Dependent Service

Figure 3A:
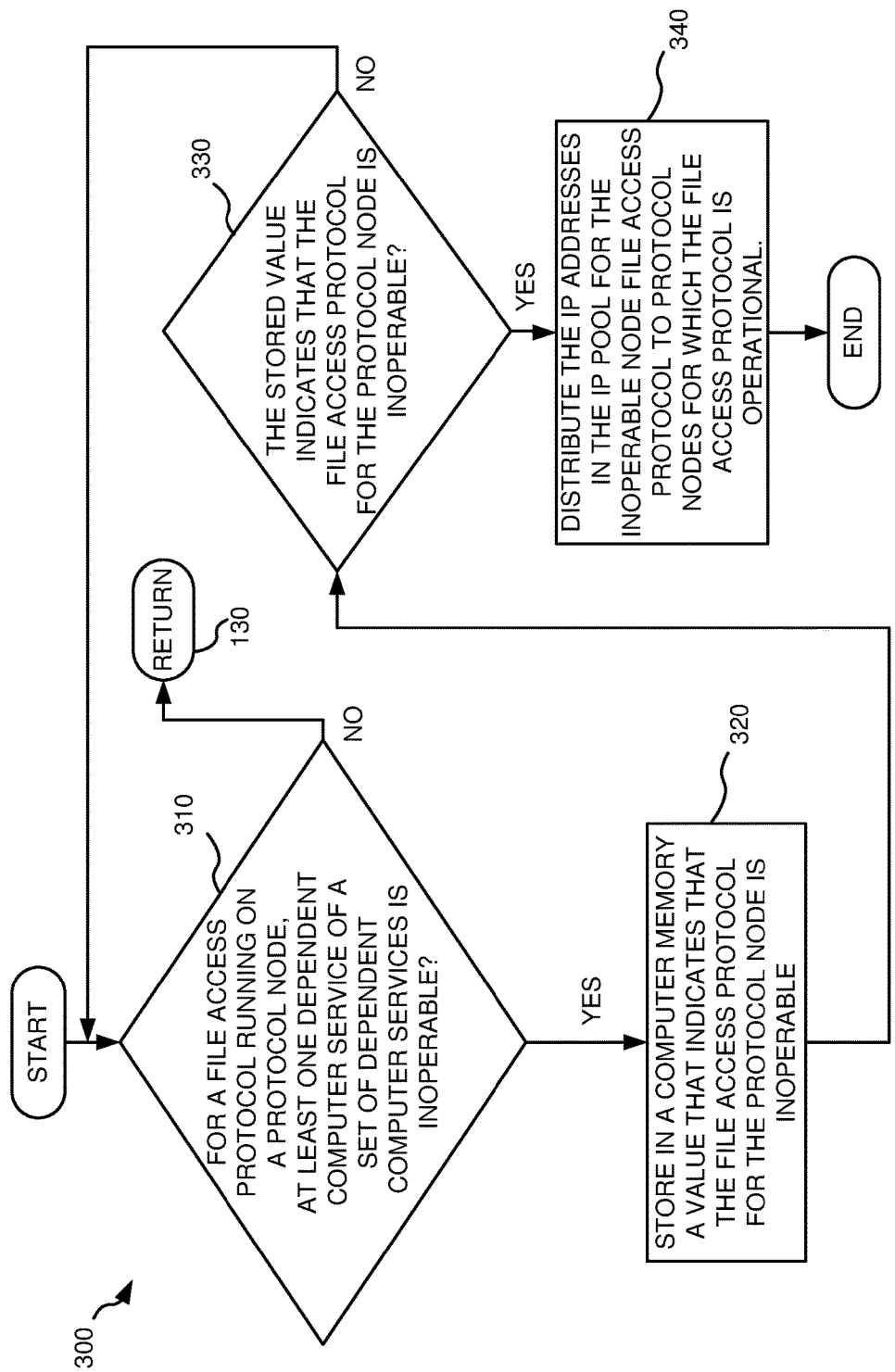
FIG. 3A depicts a flowchart in accordance with an exemplary embodiment of the present invention.

In an exemplary embodiment, the computer implemented method, the system, and the computer program product further include (a) for a file access protocol, among the file access protocols, running on a protocol node among the protocol nodes, in response to determining, by the computer system, that at least one dependent computer service (dependent service) of a set of dependent computer services, where the set is required for the file access protocol to be operable, is inoperable, storing, by the computer system, in a computer memory a value that indicates that the file access protocol for the protocol node is inoperable (inoperable node file access protocol), and (b) in response to calculating, by the computer system, that the stored value indicates that the file access protocol for the protocol node is inoperable, distributing, by the computer system, the IP addresses in the IP pool for the inoperable node file access protocol to protocol nodes, among the protocol nodes, for which the file access protocol is operational. Referring to FIG. 3A, in an exemplary embodiment, the present invention is further configured to perform an operation 310 of, for a file access protocol, among the file access protocols, running on a protocol node among the protocol nodes, determining, by the computer system, whether at least one dependent computer service of a set of dependent computer services, where the set is required for the file access protocol to be operable, is inoperable, and, in response to determining that the at least one dependent computer service of the set of dependent computer services is inoperable, an operation 320 of storing, by the computer system, in a computer memory a value that indicates that the file access protocol for the protocol node is inoperable (inoperable node file access protocol). In an exemplary embodiment, the present invention is further configured to perform an operation 330 of calculating, by the computer system, whether the stored value indicates that the file access protocol for the protocol node is inoperable, and, in response to calculating that the stored value indicates that the file access protocol for the protocol node is inoperable, an operation 340 of distributing, by the computer system, the IP addresses in the IP pool for the inoperable node file access protocol to protocol nodes, among the protocol nodes, for which the file access protocol is operational. In an exemplary embodiment, the computer system is a central server or an active monitoring administration node computer system (node), such as computer system 500 shown in FIG. 5, that executes a computer storage system management script or computer software application that carries out the operations of at least method 300.

In an exemplary embodiment, the distributing includes assigning, by the computer system, the IP addresses in the IP pool for the inoperable node file access protocol to the protocol nodes, among the protocol nodes, for which the file access protocol is operational, in an equally distributed round robin fashion. In an exemplary embodiment, the present invention is configured to perform operation 340 by assigning, by the computer system, the IP addresses in the IP pool for the inoperable node file access protocol to the protocol nodes, among the protocol nodes, for which the file access protocol is operational, in an equally distributed round robin fashion. For example, if the present invention is operating in the context of three protocol nodes (e.g., node 1, node 2, and node 3) and six IP addresses such that the present invention had assigned to each of the three protocol nodes two of the six IP addresses and if a file access protocol is then found not to be operational on one of the three protocol nodes (e.g., node 1), then the present invention would assign the IP addresses in the IP pool for the inoperable file access protocol to the remaining two protocol nodes (e.g., node 2 and node 3) if the file access protocol is operational on the two remaining protocol nodes (e.g., node 2 and node 3).

In an exemplary embodiment, the set of dependent services for a file access protocol is dependent upon the operating system which is running on the protocol node that is running the file access protocol. In a specific embodiment, the set of dependent services for CIFS includes Server Message Block (SMB) and winbind. For example, the set of dependent services for CIFS includes SMB and winbind when the protocol node is running a Linux operating system. SMB operates as an application-layer network protocol mainly used for providing shared access to files, printers, and serial ports and miscellaneous communications between nodes on a network, and also provides an authenticated inter-process communication mechanism. winbind is a component of a Samba suite of programs that solves a unified logon problem by using a UNIX implementation of Microsoft® remote procedure calls (RPCs), Pluggable Authentication Modules (PAMs), and a name service switch (NSS) to allow Microsoft Windows NT® domain users to appear and operate as UNIX® operating system users on a computer system running a UNIX® operating system.

In a specific embodiment, the set of dependent services for NFS includes nfsd and rpc.statd. For example, the set of dependent services for NFS includes nfsd and rpc.statd when the protocol node is running a LINUX® operating system. NFSD is a filesystem which provides access to a LINUX® NFS server and includes a directory which contains a number of files, which are gateways into the NFS server, where writing to the files could affect the NFS server and where reading from the files could provide information about the NFS server. rpc.statd is a daemon/server that implements a Network Status Monitor (NSM) RPC protocol, where NSM implements a reboot notification service, used by an NFS file locking service, rpc.lockd, to implement lock recovery when the NFS server machine crashes and reboots. For each NFS client or server machine to be monitored, rpc.statd creates a file in /var/lib/nfs/statd/sm. When starting, rpc.statd iterates through these files and notifies the peer rpc.statd on those machines.

In a specific embodiment, the set of dependent services for OBJECT includes ProxyServer, ContainerServer, ObjectServer, Auditor, Replicator, Keystone, and Database (postgres). For example, the set of dependent services for OBJECT includes ProxyServer, ContainerServer, ObjectServer, Auditor, Replicator, Keystone, and Database(postgres) when the protocol node is running a LINUX® operating system. ProxyServer is a server (a computer system or an application) that acts as an intermediary for requests from clients seeking resources from other servers, where a client connects to the proxy server, requesting some service, such as a file, connection, web page, or other resource available from a different server and the proxy server evaluates the request as a way to simplify and control its complexity. ContainerServer is a computer object that handles listings of objects and knows what objects are in a specific container, where the listings are stored as sqlite database files, and replicated across the cluster similar to how objects are and where statistics are tracked that include the total number of objects, and total storage usage for that container. ObjectServer is a storage server that can store, retrieve and delete objects stored on local devices, where objects are stored as binary files on the filesystem with metadata stored in the file's extended attributes (xattrs). Auditor is a computer object that crawls a local object system on a computer system, checking the integrity of objects, where if corruption is found (in the case of bit rot, for example), the file is quarantined, and replication will replace the bad file from another replica. Replicator is a computer object/daemon that replicates object data to other computer servers. Keystone is a computer object/service that provides application programming interface (API) client authentication, service discovery, and distributed multi-tenant authorization. Database (postgrest)/postgres is postgres is a PostgreSQL™ database server, where in order for a client application to access a database, the client connects (over a network or locally) to a running postgres instance, where the postgres instance then starts a separate server process to handle the connection.

In a specific embodiment, the set of dependent services for HTTP includes HTTP Daemon (httpd). For example, the set of dependent services for HTTP includes httpd when the protocol node is running a LINUX® operating system. httpd is a software program/daemon that runs in the background of a web server and waits for the incoming server requests, answers the request automatically, and serves the hypertext and multimedia documents over the internet using HTTP.

In a specific embodiment, the set of dependent services for FTP includes very secure FTP daemon (vsftpd). For example, the set of dependent services for FTP includes vsftpd when the protocol node is running a LINUX® operating system. vsftpd is an FTP server for UNIX®-like systems, including LINUX®.

Figure 3B:
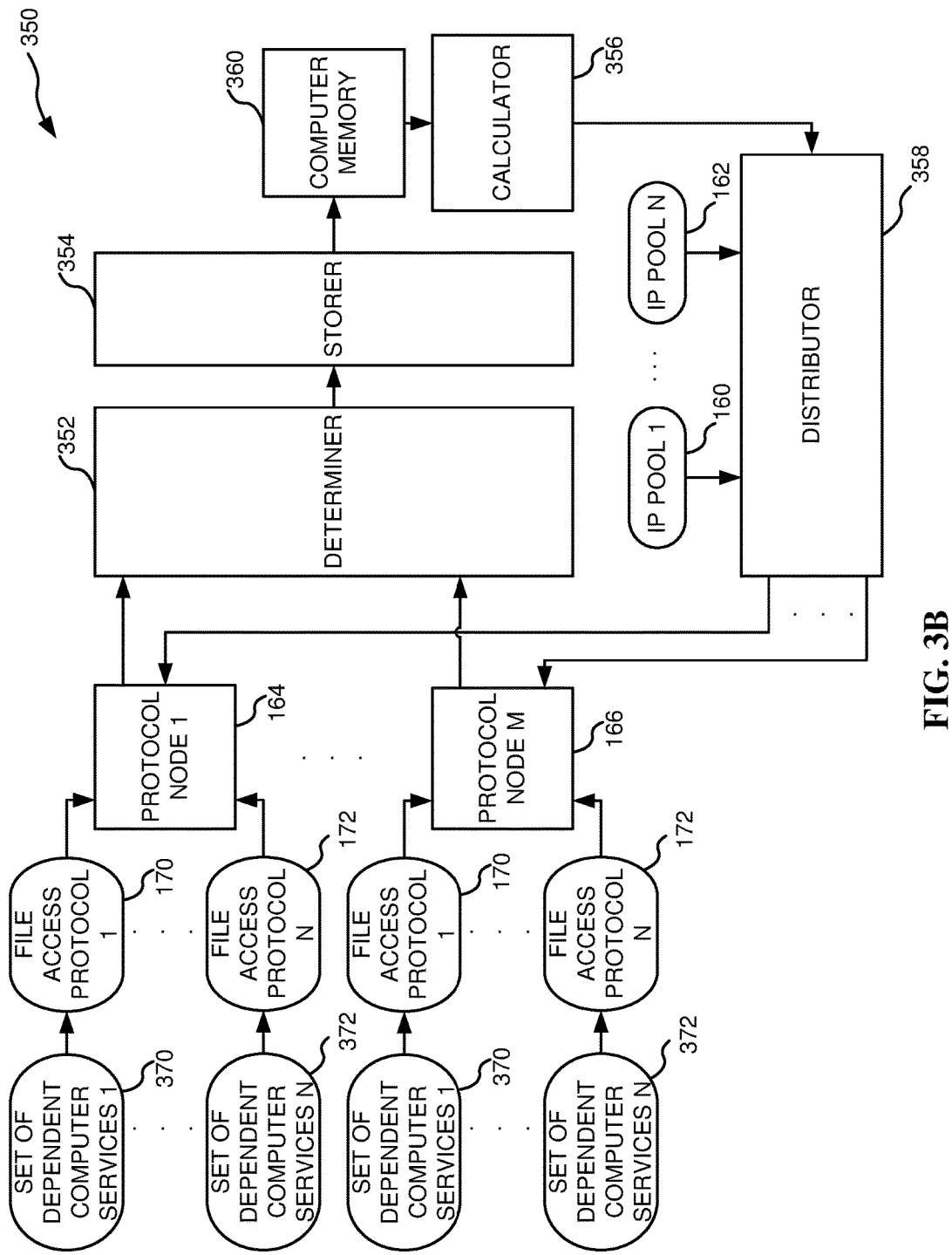
FIG. 3B depicts a block diagram in accordance with an exemplary embodiment of the present invention.

Referring to FIG. 3B, in an exemplary embodiment, the present invention further includes a determiner 352, a storer 354, a calculator 356, and a distributor 358. In an exemplary embodiment, determiner 352 is configured, for a file access protocol, among file access protocols 170 and 172, running on a protocol node among protocol nodes 164 and 166, to determine whether at least one dependent computer service (dependent service) of a set of dependent computer services 370, 372, where set 370, 372 is required for the file access protocol to be operable, is inoperable. In an exemplary embodiment, storer 354 is configured, in response to determiner 352 determining that the at least one dependent computer service of set of dependent computer services 370, 372 is inoperable, to store in a computer memory 360 a value that indicates that the file access protocol for the protocol node is inoperable (inoperable node file access protocol). In an exemplary embodiment, calculator 356 is configured to calculate whether the stored value indicates that the file access protocol for the protocol node is inoperable. In an exemplary embodiment, distributor 358 is configured, in response to calculator 356 calculating that the stored value indicates that the file access protocol for the protocol node is inoperable, to distribute the IP addresses in the IP pool for the inoperable node file access protocol to protocol nodes, among protocol nodes 164 and 166, for which the file access protocol is operational.

In an exemplary embodiment, determiner 352 includes a computer system, such as computer system 500 as shown in FIG. 5, performing operation 310. In an exemplary embodiment, determiner 352 is implemented as computer software executing on a computer system, such as computer system 500 as shown in FIG. 5, such that the computer system performs operation 310. In an exemplary embodiment, storer 354 includes a computer system, such as computer system 500 as shown in FIG. 5, performing operation 320. In an exemplary embodiment, storer 354 is implemented as computer software executing on a computer system, such as computer system 500 as shown in FIG. 5, such that the computer system performs operation 320. In an exemplary embodiment, calculator 356 includes a computer system, such as computer system 500 as shown in FIG. 5, performing operation 330. In an exemplary embodiment, calculator 356 is implemented as computer software executing on a computer system, such as computer system 500 as shown in FIG. 5, such that the computer system performs operation 330. In an exemplary embodiment, distributor 358 includes a computer system, such as computer system 500 as shown in FIG. 5, performing operation 340. In an exemplary embodiment, distributor 358 is implemented as computer software executing on a computer system, such as computer system 500 as shown in FIG. 5, such that the computer system performs operation 340.

Inoperable System Wide Service

Figure 4A:
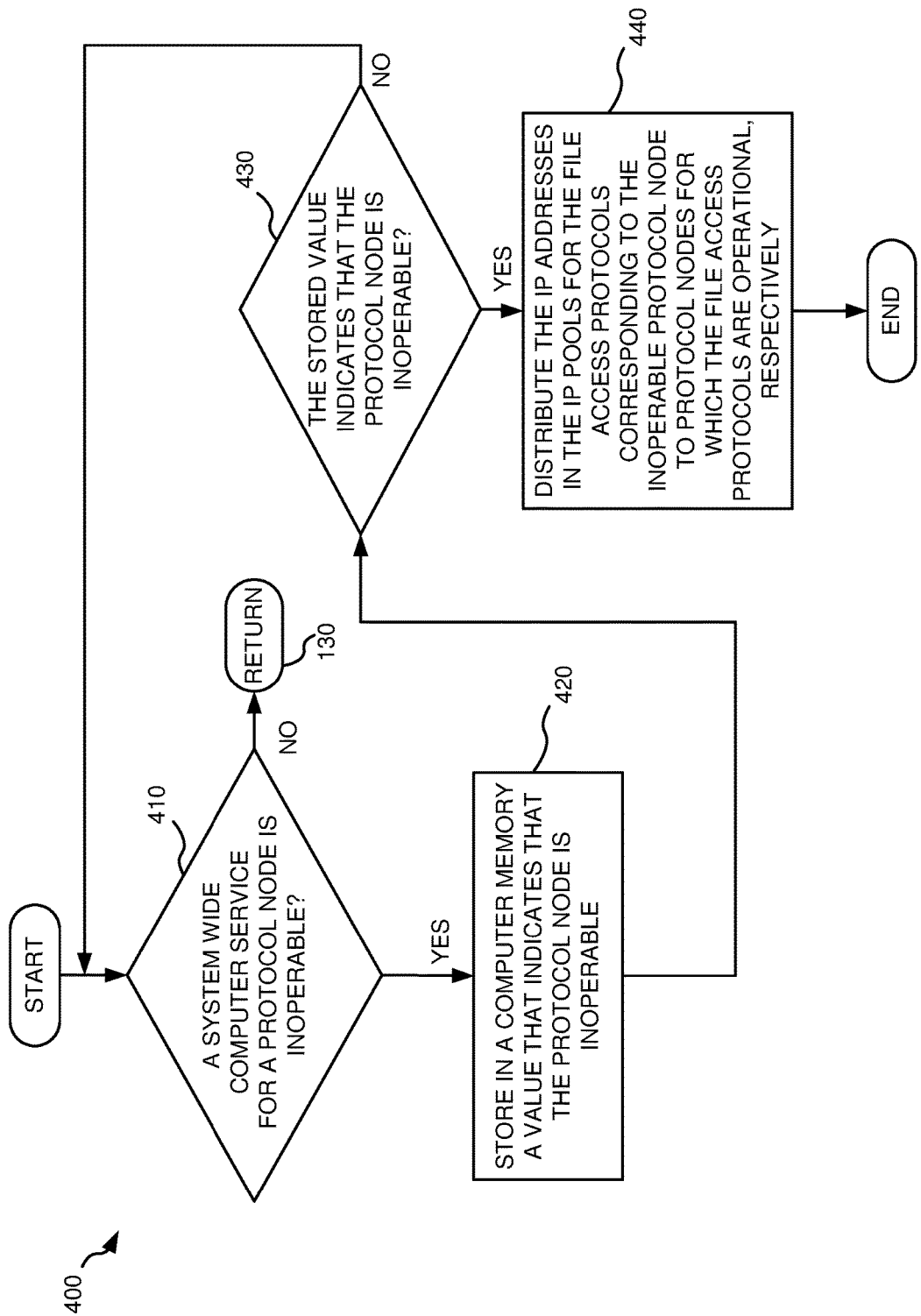
FIG. 4A depicts a flowchart in accordance with an exemplary embodiment of the present invention.

In an exemplary embodiment, the computer implemented method, the system, and the computer program product further include (a) in response to determining, by the computer system, that a system wide computer service (system wide service) for a protocol node among the protocol nodes, where the system wide service is required for the protocol node to be operable, is inoperable, storing, by the computer system, in a computer memory a value that indicates that the protocol node is inoperable (inoperable protocol node), and (b) in response to calculating, by the computer system, that the stored value indicates that the protocol node is inoperable, distributing, by the computer system, the IP addresses in the IP pools for the file access protocols corresponding to the inoperable protocol node to protocol nodes, among the protocol nodes, for which the file access protocols are operational, respectively. Referring to FIG. 4A, in an exemplary embodiment, the present invention is further configured to perform an operation 410 of determining, by the computer system, whether a system wide computer service (system wide service) for a protocol node among the protocol nodes, where the system wide service is required for the protocol node to be operable, is inoperable, and, in response to determining that the system wide service for the protocol node among the protocol nodes is inoperable, an operation 420 of storing, by the computer system, in a computer memory a value that indicates that the protocol node is inoperable (inoperable protocol node). In an exemplary embodiment, the present invention is further configured to perform an operation 430 of calculating, by the computer system, whether the stored value indicates that the protocol node is inoperable, and, in response to calculating that the stored value indicates that the protocol node is inoperable, an operation 440 of distributing, by the computer system, the IP addresses in the IP pools for the file access protocols corresponding to the inoperable protocol node to protocol nodes, among the protocol nodes, for which the file access protocols are operational, respectively. In an exemplary embodiment, the computer system is a central server or an active monitoring administration node computer system (node), such as computer system 500 shown in FIG. 5, that executes a computer storage system management script or computer software application that carries out the operations of at least method 400.

In an exemplary embodiment, the distributing includes assigning, by the computer system, the IP addresses in the IP pools for the file access protocols corresponding to the inoperable protocol node to the protocol nodes, among the protocol nodes, for which the file access protocols are operational, respectively, in an equally distributed round robin fashion. In an exemplary embodiment, the present invention is configured to perform operation 440 by assigning, by the computer system, the IP addresses in the IP pools for the file access protocols corresponding to the inoperable protocol node to the protocol nodes, among the protocol nodes, for which the file access protocols are operational, respectively, in an equally distributed round robin fashion. For example, if the present invention is operating in the context of three protocol nodes (e.g., node 1, node 2, and node 3) and six IP addresses such that the present invention had assigned to each of the three protocol nodes two of the six IP addresses and if a protocol node is then found not to be operational (e.g., node 1), then the present invention would assign the IP addresses in the IP pools for the file access protocols corresponding to the inoperable protocol node to the remaining two protocol nodes (e.g., node 2 and node 3) if the file access protocols are operational on the two remaining protocol nodes (e.g., node 2 and node 3).

In an exemplary embodiment, the system wide computer service is selected from the group consisting of FileSystem, Networking, and Authentication. The system wide computer service named FileSystem makes data available on a node which is then exported/exposed to a client via various protocol services, such that if FileSystem is not available on the node, then protocol services would not be able to serve client requests for data via the node. The core of a NAS system is a clustered file system (e.g., GPFS in Spectrum Scale/SONAS/V7000U), which may use the system wide service named FileSystem. The system wide computer service named Networking provides node communication for a NAS system, which is a cluster of nodes, such that if Networking is inoperable, then the NAS would not work normally. For example, if a network interface controller (NIC) card on one node in the NAS were to fail, then a Networking driver would not work or would not be loaded, thereby resulting in improper assignment of IP addresses. The system wide computer service named Authentication makes sure that the right users/client computer systems (with correct credentials) are accessing data stored on a NAS system, such that if the Authentication service is down, then protocol services would not be able to verify the client computer system/user, thereby resulting in the NAS being unable to serve the client computer's request for data from the NAS system.

Figure 4B:
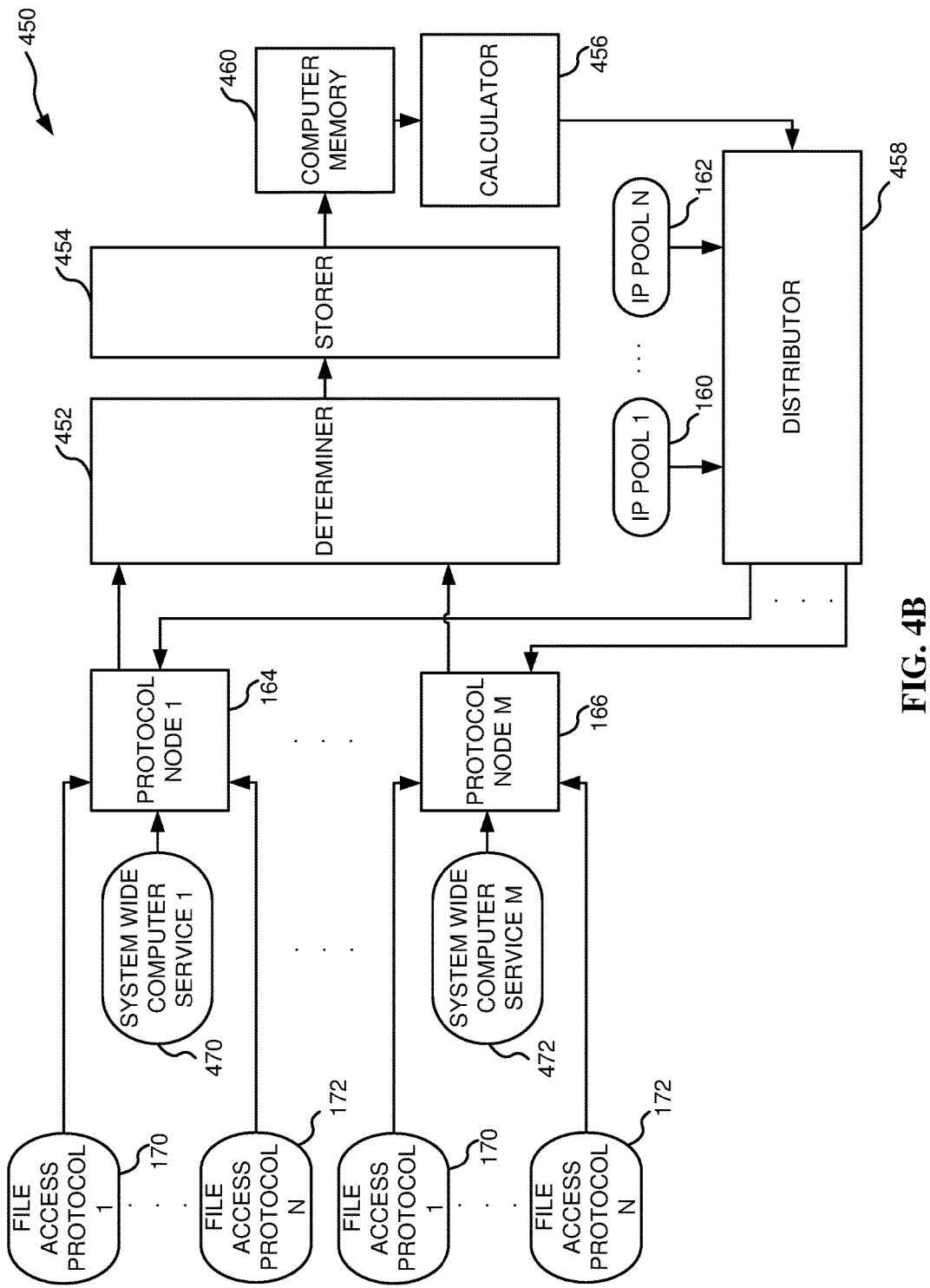
FIG. 4B depicts a block diagram in accordance with an exemplary embodiment of the present invention.

Referring to FIG. 4B, in an exemplary embodiment, the present invention further includes a determiner 452, a storer 454, a calculator 456, and a distributor 458. In an exemplary embodiment, determiner 452 is configured to determine whether a system wide computer service (system wide service) 470, 472 for a protocol node among protocol nodes 164 and 166, where the system wide service is required for the protocol node to be operable, is inoperable. In an exemplary embodiment, storer 454 is configured, in response to determiner 452 determining that the system wide service for the protocol node among protocol nodes 164 and 166 is inoperable, to store in a computer memory 460 a value that indicates that the protocol node is inoperable (inoperable protocol node). In an exemplary embodiment, calculator 456 is configured to calculate whether the stored value indicates that the protocol node is inoperable. In an exemplary embodiment, distributor 458 is configured, in response to calculator 456 calculating that the stored value indicates that the protocol node is inoperable, to distribute the IP addresses in the IP pools for the file access protocols corresponding to the inoperable protocol node to protocol nodes, among protocol nodes 164 and 166, for which the file access protocols are operational, respectively.

In an exemplary embodiment, determiner 452 includes a computer system, such as computer system 500 as shown in FIG. 5, performing operation 410. In an exemplary embodiment, determiner 452 is implemented as computer software executing on a computer system, such as computer system 500 as shown in FIG. 5, such that the computer system performs operation 410. In an exemplary embodiment, storer 454 includes a computer system, such as computer system 500 as shown in FIG. 5, performing operation 420. In an exemplary embodiment, storer 454 is implemented as computer software executing on a computer system, such as computer system 500 as shown in FIG. 5, such that the computer system performs operation 420. In an exemplary embodiment, calculator 456 includes a computer system, such as computer system 500 as shown in FIG. 5, performing operation 430. In an exemplary embodiment, calculator 456 is implemented as computer software executing on a computer system, such as computer system 500 as shown in FIG. 5, such that the computer system performs operation 430. In an exemplary embodiment, distributor 458 includes a computer system, such as computer system 500 as shown in FIG. 5, performing operation 440. In an exemplary embodiment, distributor 458 is implemented as computer software executing on a computer system, such as computer system 500 as shown in FIG. 5, such that the computer system performs operation 440.

Computer System

In an exemplary embodiment, the computer system is a computer system 500 as shown in FIG. 5. Computer system 500 is only one example of a computer system and is not intended to suggest any limitation as to the scope of use or functionality of embodiments of the present invention. Regardless, computer system 500 is capable of being implemented to perform and/or performing any of the functionality/operations of the present invention.

Computer system 500 includes a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 512 may be described in the general context of computer system-executable instructions, such as program modules, being executed by a computer system. Generally, program modules may include routines, programs, objects, components, logic, and/or data structures that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computer system 500 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions/operations of embodiments of the invention.

Program/utility 540, having a set (at least one) of program modules 542, may be stored in memory 528 by way of example, and not limitation. Exemplary program modules 542 may include an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the present invention.

Computer system/server 512 may also communicate with one or more external devices 514 such as a keyboard, a pointing device, a display 24, one or more devices that enable a user to interact with computer system/server 512, and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method comprising:
    generating, by a computer system, a pool of internet protocol (IP) addresses (IP pool) for each of a plurality of computer file access protocols (file access protocols) running on a plurality of protocol node computer systems (protocol nodes), wherein the protocol nodes are configured to access a plurality of computer files stored on a network-attached storage system via a plurality of computer file access protocol services (protocol services) corresponding to the file access protocols, resulting in a plurality of IP pools comprising IP addresses;
    for each IP pool, among the IP pools, corresponding to a file access protocol among the file access protocols, assigning, by the computer system, the IP addresses in the IP pool to protocol nodes, among the protocol nodes, for which the file access protocol is operational;
    in response to determining, by the computer system, that a protocol service among the protocol services is inoperable (inoperable protocol service) for a protocol node among the protocol nodes, storing, by the computer system, in a computer memory a value that indicates that a file access protocol, among the file access protocols, corresponding to the inoperable protocol service for the protocol node is inoperable (inoperable node file access protocol); and
    in response to calculating, by the computer system, that the stored value indicates that the file access protocol for the protocol node is inoperable, distributing, by the computer system, the IP addresses in the IP pool for the inoperable node file access protocol to protocol nodes, among the protocol nodes, for which the file access protocol is operational.

2. The method of claim 1 wherein the distributing comprises assigning, by the computer system, the IP addresses in the IP pool for the inoperable node file access protocol to the protocol nodes, among the protocol nodes, for which the file access protocol is operational, in an equally distributed round robin fashion.

3. The method of claim 1 further comprising:
    for a file access protocol, among the file access protocols, running on a protocol node among the protocol nodes, in response to determining, by the computer system, that at least one dependent computer service of a set of dependent computer services, wherein the set is required for the file access protocol to be operable, is inoperable, storing, by the computer system, in a computer memory a value that indicates that the file access protocol for the protocol node is inoperable (inoperable node file access protocol); and
    in response to determining, by the computer system, that the stored value indicates that the file access protocol for the protocol node is inoperable, distributing, by the computer system, the IP addresses in the IP pool for the inoperable node file access protocol to protocol nodes, among the protocol nodes, for which the file access protocol is operational.

4. The method of claim 3 wherein the distributing comprises assigning, by the computer system, the IP addresses in the IP pool for the inoperable node file access protocol to the protocol nodes, among the protocol nodes, for which the file access protocol is operational, in an equally distributed round robin fashion.

5. The method of claim 1 further comprising:
    in response to determining, by the computer system, that a system wide computer service (system wide service) for a protocol node among the protocol nodes, wherein the system wide service is required for the protocol node to be operable, is inoperable, storing, by the computer system, in a computer memory a value that indicates that the protocol node is inoperable (inoperable protocol node); and in response to calculating, by the computer system, that the stored value indicates that the protocol node is inoperable, distributing, by the computer system, the IP addresses in the IP pools for the file access protocols corresponding to the inoperable protocol node to protocol nodes, among the protocol nodes, for which the file access protocols are operational, respectively.

6. The method of claim 5 wherein the distributing comprises assigning, by the computer system, the IP addresses in the IP pools for the file access protocols corresponding to the inoperable protocol node to the protocol nodes, among the protocol nodes, for which the file access protocols are operational, respectively, in an equally distributed round robin fashion.

7. The method of claim 1 wherein each of the file access protocols is selected from the group consisting of Common Internet File System (CIFS), Network File System (NFS), OBJECT, Hypertext Transfer Protocol (HTTP), and File Transfer Protocol (FTP).

8. The method of claim 5 wherein the system wide computer service is selected from the group consisting of file system, networking, and authentication.

9. A system comprising:
a computer system comprising a memory and a processor; and
a computer readable storage medium of the computer system comprising program instructions embodied therewith, wherein the program instructions are executable by the processor to cause the system to:
generate a pool of internet protocol (IP) addresses (IP pool) for each of a plurality of computer file access protocols (file access protocols) running on a plurality of protocol node computer systems (protocol nodes), wherein the protocol nodes are configured to access a plurality of computer files stored on a network-attached storage system via a plurality of computer file access protocol services (protocol services) corresponding to the file access protocols, resulting in a plurality of IP pools comprising IP addresses,
for each IP pool, among the IP pools, corresponding to a file access protocol among the file access protocols, assign, the IP addresses in the IP pool to protocol nodes, among the protocol nodes, for which the file access protocol is operational,
determine whether a protocol service among the protocol services is inoperable (inoperable protocol service) for a protocol node among the protocol nodes,
in response to determining that the protocol service among the protocol services is inoperable, store in a computer memory a value that indicates that a file access protocol, among the file access protocols, corresponding to the inoperable protocol service for the protocol node is inoperable (inoperable node file access protocol),
calculate whether the stored value indicates that the file access protocol for the protocol node is inoperable, and
in response to calculating that the stored value indicates that the file access protocol for the protocol node is inoperable, distribute the IP addresses in the IP pool for the inoperable node file access protocol to protocol nodes, among the protocol nodes, for which the file access protocol is operational.

10. The system of claim 9, wherein the program instructions are executable by the processor to cause the system further to, in response to calculating that the stored value indicates that the file access protocol for the protocol node is inoperable, assign the IP addresses in the IP pool for the inoperable node file access protocol to the protocol nodes, among the protocol nodes, for which the file access protocol is operational, in an equally distributed round robin fashion.

11. The system of claim 9, wherein the program instructions are executable by the processor to cause the system further to:
for a file access protocol, among the file access protocols, running on a protocol node among the protocol nodes, determine whether at least one dependent computer service of a set of dependent computer services, where the set is required for the file access protocol to be operable, is inoperable;
in response to determining that the at least one dependent computer service of the set of dependent computer services is inoperable, store in a computer memory a value that indicates that the file access protocol for the protocol node is inoperable (inoperable node file access protocol);
calculate whether the stored value indicates that the file access protocol for the protocol node is inoperable; and
in response to calculating that the stored value indicates that the file access protocol for the protocol node is inoperable, distribute the IP addresses in the IP pool for the inoperable node file access protocol to protocol nodes, among the protocol nodes, for which the file access protocol is operational.

12. The system of claim 11, wherein the program instructions are executable by the processor to cause the system further to, in response to calculating that the stored value indicates that the file access protocol for the protocol node is inoperable, assign the IP addresses in the IP pool for the inoperable node file access protocol to the protocol nodes, among the protocol nodes, for which the file access protocol is operational, in an equally distributed round robin fashion.

13. The system of claim 9, wherein the program instructions are executable by the processor to cause the system further to:
determine whether a system wide computer service (system wide service) for a protocol node among the protocol nodes, where the system wide service is required for the protocol node to be operable, is inoperable;
in response to determining that the system wide service for the protocol node among the protocol nodes is inoperable, store in a computer memory a value that indicates that the protocol node is inoperable (inoperable protocol node);
calculate whether the stored value indicates that the protocol node is inoperable; and
in response to calculating that the stored value indicates that the protocol node is inoperable, distribute the IP addresses in the IP pools for the file access protocols corresponding to the inoperable protocol node to protocol nodes, among the protocol nodes, for which the file access protocols are operational, respectively.

14. The system of claim 13, wherein the program instructions are executable by the processor to cause the system further to, in response to calculating that the stored value indicates that the protocol node is inoperable, assign the IP addresses in the IP pools for the file access protocols corresponding to the inoperable protocol node to the protocol nodes, among the protocol nodes, for which the file access protocols are operational, respectively, in an equally distributed round robin fashion.

15. A computer program product comprising a computer readable storage medium having program instructions embodied therewith, wherein the program instructions are executable by a processing circuit to cause the processing circuit to:

generate a pool of internet protocol (IP) addresses (IP pool) for each of a plurality of computer file access protocols (file access protocols) running on a plurality of protocol node computer systems (protocol nodes), wherein the protocol nodes are configured to access a plurality of computer files stored on a network-attached storage system via a plurality of computer file access protocol services (protocol services) corresponding to the file access protocols, resulting in a plurality of IP pools comprising IP addresses;

for each IP pool, among the IP pools, corresponding to a file access protocol among the file access protocols, assign, the IP addresses in the IP pool to protocol nodes, among the protocol nodes, for which the file access protocol is operational;

determine whether a protocol service among the protocol services is inoperable (inoperable protocol service) for a protocol node among the protocol nodes;

in response to determining that the protocol service among the protocol services is inoperable, store in a computer memory a value that indicates that a file access protocol, among the file access protocols, corresponding to the inoperable protocol service for the protocol node is inoperable (inoperable node file access protocol);

calculate whether the stored value indicates that the file access protocol for the protocol node is inoperable; and in response to calculating that the stored value indicates that the file access protocol for the protocol node is inoperable, distribute the IP addresses in the IP pool for the inoperable node file access protocol to protocol nodes, among the protocol nodes, for which the file access protocol is operational.

16. The computer program product of claim 15, wherein the program instructions are executable by the processing circuit to cause the processing circuit further to:

for a file access protocol, among the file access protocols, running on a protocol node among the protocol nodes, determine whether at least one dependent computer service of a set of dependent computer services, where the set is required for the file access protocol to be operable, is inoperable;

in response to determining that the at least one dependent computer service of the set of dependent computer services is inoperable, store in a computer memory a value that indicates that the file access protocol for the protocol node is inoperable (inoperable node file access protocol);

calculate whether the stored value indicates that the file access protocol for the protocol node is inoperable; and in response to calculating that the stored value indicates that the file access protocol for the protocol node is inoperable, distribute the IP addresses in the IP pool for the inoperable node file access protocol to protocol nodes, among the protocol nodes, for which the file access protocol is operational.

17. The computer program product of claim 15, wherein the program instructions are executable by the processing circuit to cause the processing circuit further to:

determine whether a system wide computer service (system wide service) for a protocol node among the protocol nodes, where the system wide service is required for the protocol node to be operable, is inoperable;

in response to determining that the system wide service for the protocol node among the protocol nodes is inoperable, store in a computer memory a value that indicates that the protocol node is inoperable (inoperable protocol node);

calculate whether the stored value indicates that the protocol node is inoperable; and in response to calculating that the stored value indicates that the protocol node is inoperable, distribute the IP addresses in the IP pools for the file access protocols corresponding to the inoperable protocol node to protocol nodes, among the protocol nodes, for which the file access protocols are operational, respectively.

* * * * *